United States Patent [19]

Marenger

[11] Patent Number: 5,253,887
[45] Date of Patent: Oct. 19, 1993

[54] DOLLY MODIFYING APPARATUS

[76] Inventor: Keith J. Marenger, 576 E. Baker, Clawson, Mich. 48017

[21] Appl. No.: 863,414

[22] Filed: Apr. 3, 1992

[51] Int. Cl.⁵ .............................................. B62B 3/10
[52] U.S. Cl. ................................... 280/79.3; 280/651; 280/47.34; 280/79.7
[58] Field of Search ................ 280/47.34, 79.11, 79.3, 280/79.7, 47.35, 638, 35, 639, 47.41, 727, 651

[56] References Cited

U.S. PATENT DOCUMENTS

| | | | |
|---|---|---|---|
| 2,681,233 | 6/1954 | Smith | 280/79.7 |
| 3,027,174 | 3/1962 | Garbarino | 280/79.11 |
| 3,744,812 | 7/1973 | Langhausen | 280/79.3 |
| 4,220,346 | 9/1980 | Geschwender | 280/47.18 |
| 4,720,115 | 1/1988 | Rehrig | 280/79.11 |
| 4,793,624 | 12/1988 | Mace | 280/47.16 |
| 4,867,465 | 9/1989 | Dunchock | 280/79.7 |
| 5,037,117 | 8/1991 | Hershberger | 280/79.7 |
| 5,120,072 | 6/1992 | Laramie | 280/79.7 |

Primary Examiner—Richard M. Camby
Attorney, Agent, or Firm—Harness, Dickey & Pierce

[57] ABSTRACT

An apparatus for converting a four wheel dolly into a form useful for supporting and transporting large objects. The apparatus includes a selectively detachable frame having a upwardly projecting triangularly portion extending from a base member and an extender which is attachable to the base portion. The detachable frame is secured to the dolly by an adjustable slide bar.

11 Claims, 2 Drawing Sheets

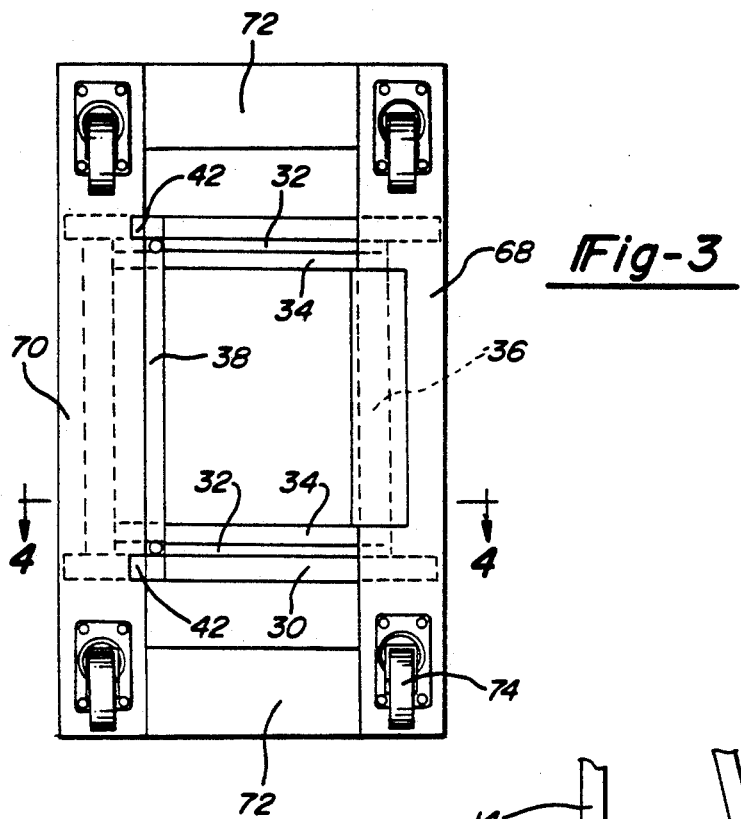
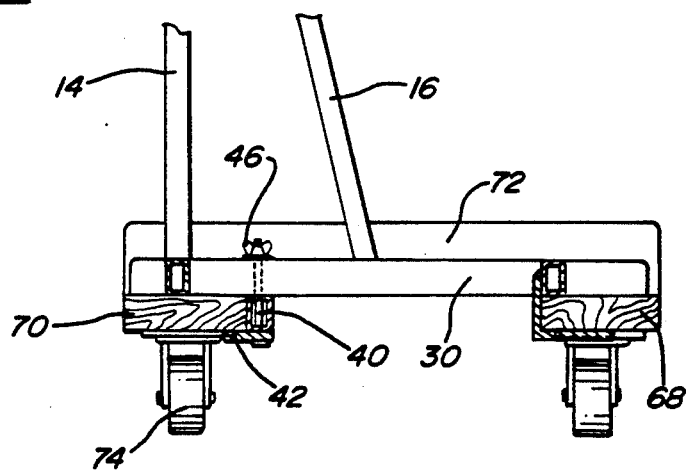

5,253,887

DOLLY MODIFYING APPARATUS

BACKGROUND OF THE INVENTION

1. Field of the Invention

The present invention relates to an apparatus useful for moving large objects and, more particularly, to a selectively detachable frame for modifying a four wheel dolly to a form useful for transporting large elongated objects.

2. Description of Related Art

A number of dollies or carts having upwardly extending frame portions and which are useful for transporting large objects are known. For example, U.S. Pat. No. 3,744,812, which issued Jul. 10, 1973 to Langhausen, discloses a two section dolly for the support and transportation of large vertically oriented objects such as a pool table. The dolly includes an upright portion consisting of a pair of laterally spaced side posts extending upwardly from opposite ends of the base.

U.S. Pat. No. 4,793,624, which issued Dec. 27, 1988 to Mace, likewise discloses a cart used to transport planar materials in an upright position supported by a removable vertical side support. The cart includes a support platform, wherein three legs are inserted through the support platform into receivers which secure the vertical support.

U.S. Pat. No. 3,003,788, which issued Oct. 10, 1961 to Grymer, discloses a truck including a planar rectangular platform having removable longitudinal side vertical supports used in positioning objects on their edge and at an angle.

None of the sources available to the inventor, such as United States patents and literature available throughout the moving industry, disclose a selectively detachable apparatus for modifying a four wheel dolly to a form useful for transporting large objects. Persons involved in the process of moving objects a considerable distance recognize the need for moving equipment which is easy to use and capable of supporting and transporting various objects. Heretofore, moving equipment useful for transporting large planar objects, such as a pool table, tend to be excessively large and hard to use. When such moving equipment is not being used, the equipment takes up considerable floor space which is costly.

Accordingly, one of the principal objects of the present invention is to provide a frame which is attachable to various types of four wheel dollies which, when not in use, may be detached from the four wheel dolly and hung on a wall to conserve valuable floor space.

Another object of the present invention is to provide an apparatus which allows for front loading and unloading of the objects to be transported.

Another object of the present invention is to provide an apparatus which is inexpensive and relatively easy to manufacture.

Yet another object of the present invention is to provide an apparatus which is compact, lightweight, and easy to use.

Generally, the attachable and selectively detachable apparatus of the present invention comprises a triangular frame portion which extends upwardly from a planer base member and an adjustable slide bar which serves to lock the apparatus onto the four wheel dolly. The triangular frame includes rear vertical support bars and forward angled support bars extending upwardly from the base on opposing sides of the apparatus. A connecting brace is provided at the top of the triangular frame and extends therebetween to adjoin both triangular portions at the point where the forward and rear support bars come together. The base member has a substantially rectangular area which includes front, back and side walls. Extending between the front and back walls are a pair of guide support bars spaced apart from the inner surfaces of the side walls to provide slots. The front bar is provided with a flange which extends downwardly and then outwardly, wherein the outwardly projecting portion locks under a first slat of the dolly. An adjustable slide bar is provided underneath and perpendicular to the guide support bars and includes upwardly projecting bolts which extend through and slide within the slots provided on the frame. The adjustable slide bar also includes at least one toe projecting outwardly from the underside of the slide bar which fits under a second slat of the four wheel dolly. Once the slide bar is positioned such that the flange is locked under the first slat of the dolly, wing nuts can be tightened upon the upwardly extending bolts to secure the apparatus to the four wheel dolly. An extender can be attached at the leading end of the base member to provide additional surface area upon which objects can be positioned.

Additional objects and advantages of the present invention will become apparent from reading of the detailed description of the preferred embodiments which make reference to the following set of drawings in which:

BRIEF DESCRIPTION OF THE DRAWINGS

FIG. 3 is an bottom view of the present invention; and

FIG. 4 is a sectional view of the present invention through section line 4—4 of FIG. 3.

BRIEF DESCRIPTION OF THE PREFERRED EMBODIMENT

Figure 1:
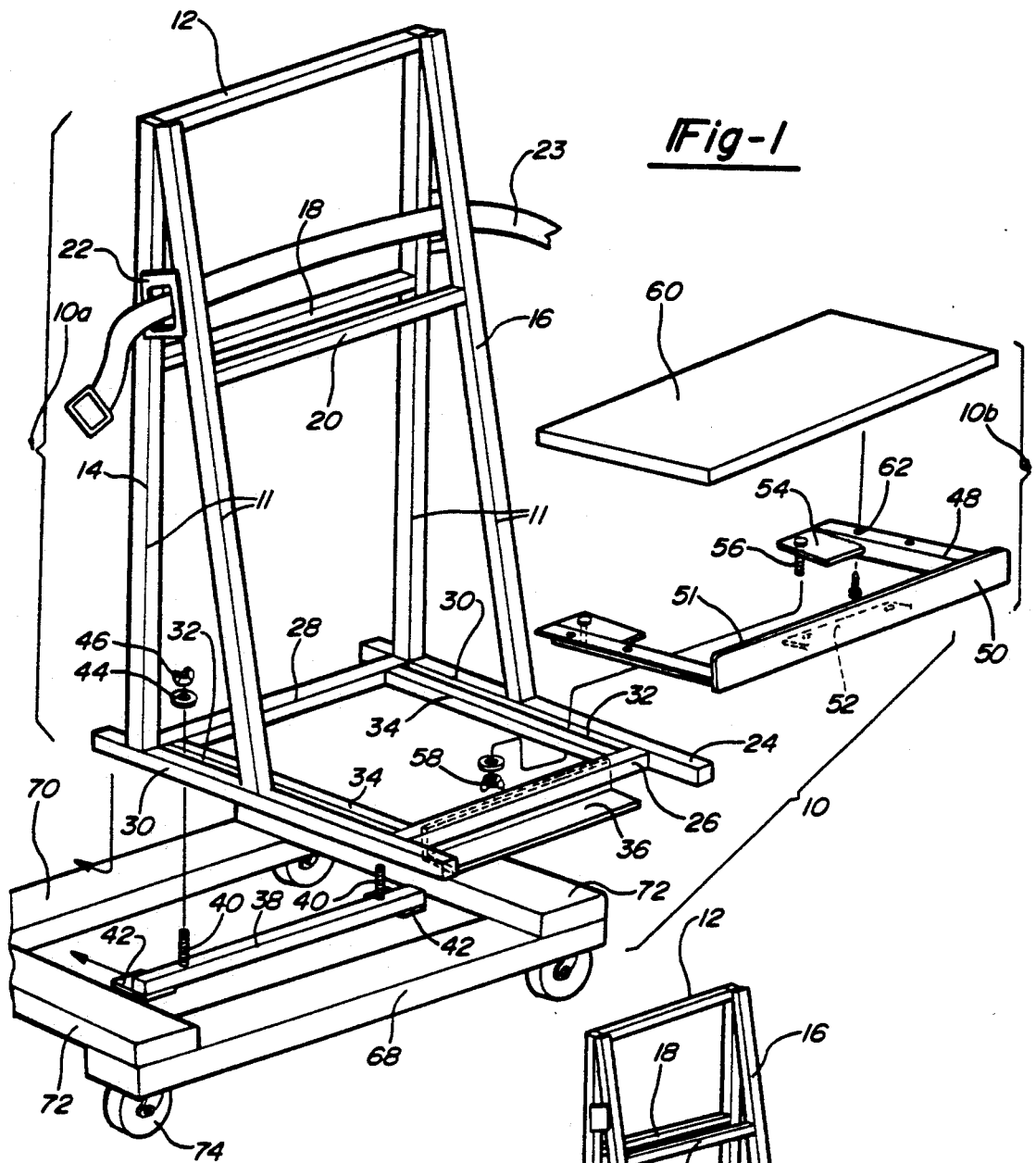
FIG. 1 is an exploded perspective view of the present invention.

Referring to FIG. 1, an exploded perspective view of the apparatus 10 for modifying a standard four wheel dolly to a form useful for supporting and transporting various large objects is shown. The apparatus 10 includes a frame member 10a and an extension platform 10b. The frame member 10a includes triangular portions 11 which extend upwardly from a base member 24. The triangular portion includes a first pair of vertical support bars 14 located at the rear of the frame 10a on opposing sides and a second pair of angled support bars 16 located more proximate to the front of the frame on opposing sides of the frame 10a. A connecting brace 12 extends between the opposing triangular portions at the points where the vertical support bars 14 and the angled support bars 16 merge. A horizontal brace 18 extends between the pair of vertical support bars 14 and a second horizontal brace 20 extends between the pair of angled support bars 16 to provide the triangular portions 11 with additional structural stability. Located proximate to the top of the triangular portions 11 are a pair of strapping braces 22 for mounting a strap 23 which is useful for securing an object to be transported against the angled support bars 16. In the preferred embodiment, strapping braces 22 each comprise a well-known "E-track" securing bracket. It will be understood by those skilled in the art, however, that the strapping braces 22 could be positioned in various spots along the triangular portions 11 depending on the needs of the user. Furthermore, it will be appreciated that a wide variety of well-known, alternative brackets could be substituted in lieu of "E-track" brackets.

Perpendicular to the vertical support bars 14 is the base member 24. The base member 24 includes first and second longitudinal supports 26 and 28, respectively, and a pair of transverse supports 30 which extend beyond the longitudinal supports 26 and 28. Extending between the first and second longitudinal supports 26 and 28 and perpendicular thereto are a pair of guide support bars 34 spaced slightly apart from the inner surface of the transverse supports 30 to form slots 32 on opposing sides of the base member 24. The first longitudinal support 26 includes a substantially L-shaped flange 36 which extends downwardly and then outwardly toward the leading end of the base member 24.

An adjustable slide bar 38 is provided which includes a pair of upwardly projecting bolts 40 spaced apart such that the bolts can extend through the slots provided on the base member 24 when the slide bar 38 abuts the bottom surfaces of the transverse supports 30 and the guide bars 34. The adjustable slide bar 38 also includes a pair of toes 42 extending rearwardly from underneath the slide bar 38.

The second major component of the present invention is an attachable extension platform 10b. The extension platform 10b includes a pair of side bars 48 extending rearwardly and perpendicularly from a shield 50. Projecting inwardly and at an angle at the end of each arm 48 is a plate member 54. Each plate member 54 is provided with a downwardly extending bolt 56 which upon connection of the extension platform 10b to the frame member 10a extends through a slot 32. An attachable shelf 60 can be mounted atop the arms 48 and projection 52 by bolts or screws 64 which project through the apertures 62 provided on each of the side bars 48.

It is contemplated that the shelf 60 can be attached to the extension platform 10b in various other ways such as by welding the shelf 60 to the extension platform or providing the shelf 60 with tiered edges such that a downwardly extending portion of the shelf 60 abuts the inner surfaces of the side bar while the edges of the shelf come to rest atop the side bars.

Figure 2:
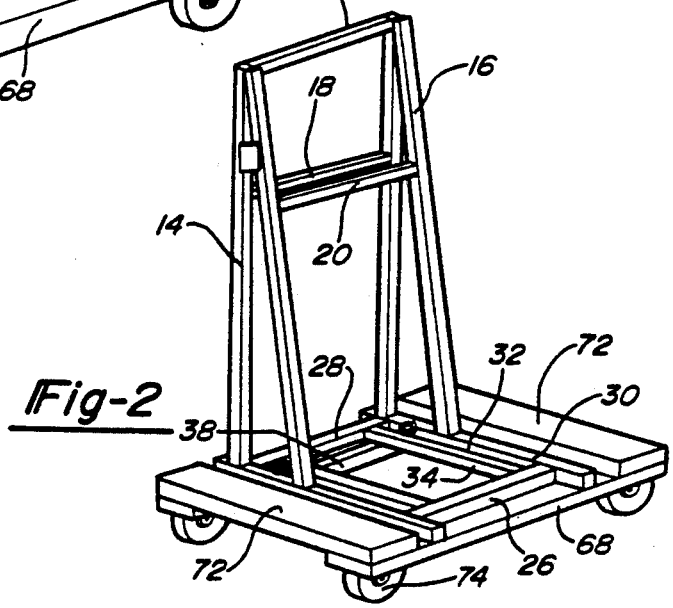
FIG. 2 is an overall assembled perspective view of the present invention.

Referring to FIG. 2, an overall perspective view of the frame member 10a as attached to a standard four wheel dolly 66 is shown. Initially, the slide bar 38 is positioned away from the second longitudinal support 28 to provide clearance. The frame member 10a is attached to a standard four wheel dolly 66 by first tilting the top of the frame forward such that the flange 36 can be slide under the first longitudinal slat 68 of the dolly 66. As the flange 36 engages the slat 68, the top of the frame is tilted backwards and the entire frame member is slid forward until the downwardly extending portion of the flange 36 abuts the inner surface of the slat 68 and the outwardly projecting portion of the flange 36 fits securely under the bottom edge of the slat 68. As more clearly shown in FIGS. 3 and 4, the slide bar 38 is then moved along slots 32 such that the slide bar 38 abuts the inner surface of the second longitudinal slat 70 of the dolly 66. With the rearwardly projecting plates 42 securely positioned underneath the bottom edge of the second longitudinal slat 70, the slide bar 38 is secured to the frame member 10a by tightening the wing nuts 46 and washer 44 against the transverse supports 30 and the guide bars 34. The frame member 10a is now detachably secured to the dolly 66.

Under certain circumstances it may be desirable to attach the extension platform 10b to the frame member 10a to assist in supporting and transporting objects. The extension platform 10b is attached to the frame member 10a by positioning the plate members 54 adjacently on top of the transverse supports 30 and the guide bars 34. The bolts 56 which extend downwardly through the plate members 54 are spaced apart such that they also are capable of extending downwardly through the slots 32. Wing nuts 58 and washers 59 are then positioned upon the bolts 56 to secure the extension platform 10b to the frame member 10a. Prior to fully tightening the wing nuts 58 and washers 59 against the underside of the transverse supports 30 and the guide bars 34, the extension platform 10b is positioned by sliding the entire platform via bolts 56 and slots 32 forward or backward to the desired position. The shelf 60 is then positioned atop and secured to the extension platform as previously described. An important feature of the extension platform 10b is that shelf 60 comes to rest below the upper edge of shield 50 to thereby provide a stop member 51 to prevent objects from sliding off the front of the extension platform 10b. Likewise, the extension platform 10b is intentionally angled such that the arms 48 are higher at the point where they extend from shield 50 than at the opposite end which contains the plate members 54 to encourage the objects being transported to position themselves against the angled support bars 16. Typically, the angle formed between the upper surface of the shelf 60 and the angled support bars 16 is about 90°.

It is contemplated by the inventor that the frame member 10a and extension platform 10b will employ metallic materials such as angle iron and sheet metal because of their excellent strength and general availability. However, advanced high strength plastics could also be utilized. The invention is susceptible to certain modifications such as providing the surfaces of the transverse supports 30 and guide bars 34 which come in contact with the bolts 40 and 56 with a lubricant such as teflon to reduce friction and enhance the adjustability of both the slide bar 38 and the extension platform 10b. Another modification would involve providing the outer surface of the angled support bars 16 and the upper face of shelf 60 with padding which would allow for the quick transportation of objects susceptible to scratching.

While the above description constituents the preferred embodiment of the present invention, it is to be appreciated that the invention is susceptible to modification, variation and change without departing from the proper scope and the fair meaning of the accompanying claims.

I claim:

1. A selectively attachable apparatus for use with a four wheel dolly having an open center area, said apparatus being useful for assisting in the transportation of objects, said apparatus comprising:

a frame member having a base portion, a support structure extending upwardly from said base portion and means for securing the frame member to said dolly;

said means for securing the frame member to said dolly including a slide bar having at least one projecting post member and retainer means selectively attachable to said post member, said base portion including slot means for receiving said at least one post member and a flange extending from a first end of the base portion, whereby upon positioning said apparatus on the dolly such that the flange engages the dolly along a first end and positioning the slide bar substantially contiguously against said dolly along a second end, by attaching said retainer means to said at least one post member the apparatus becomes secured to the dolly.

2. The apparatus of claim 1, wherein said apparatus further comprises an attachable extendable member including means for attachment to said frame member, a platform for supporting objects and stop means for precluding movement of an object.

3. The apparatus of claim 1, wherein said frame member further comprises strap means for securing said object upon said apparatus.

4. The apparatus of claim 1, wherein the base portion further comprises a pair of longitudinal bars and a pair of transverse bars arranged to have an overall rectangular shape and a pair of guide bars spaced apart from the transverse bars, whereby the spaces serve as the slot means.

5. The apparatus of claim 1, wherein the support structure includes a vertical member and an angled, substantially vertically member, whereby said objects are positionable against the angled member.

6. The apparatus of claim 1, wherein the slide bar includes at least on toe extending substantially perpendicularly to the at least one post member, said at least one toe serving to abut the dolly.

7. A selectively attachable apparatus for use with a four wheel dolly, wherein said dolly has two longitudinal slats and two transverse slats which are arranged to have an overall rectangular shape, said apparatus being useful for assisting in the transportation of objects, comprising:

a frame member having an upwardly projecting support structure, a base portion including slot means and an adjustable slide bar; and fastener means for attaching the slide bar to the frame member, said upwardly projecting support structure including a vertical member and an angled, substantially vertical member, said base portion including means projecting from said base member for engaging at least one of said slats, said adjustable slide bar including at least one projecting post member which extends through said slot means and at least one extending toe disposed substantially perpendicularly to said at least one post member, whereby upon positioning said slide bar in proximity with a slat other than the one engaged by said base member such that said toe engages the slat the apparatus becomes secured to the dolly.

8. The apparatus of claim 7, wherein the base portion further comprises a pair of longitudinal bars and a pair of transverse bars arranged to have an overall rectangular shape and a pair of guide bars spaced apart from the transverse bars, whereby the spaces serve as the slot means.

9. The apparatus of claim 7, wherein said base portion includes a flange extending from a first end of the base portion, whereby said flange abuts said first longitudinal slat.

10. The apparatus of claim 7, wherein said apparatus further comprises an attachable extendable member including means for attachment to said frame member, a platform for supporting objects and stop means for precluding transverse movement of an object.

11. The apparatus of claim 7, wherein said frame member further comprises strap means for securing said objects positioned upon said frame member.

* * * * *

UNITED STATES PATENT AND TRADEMARK OFFICE
CERTIFICATE OF CORRECTION

PATENT NO. : 5,253,887
DATED : October 19, 1993
INVENTOR(S) : Keith J. Marenger

It is certified that error appears in the above-indentified patent and that said Letters Patent is hereby corrected as shown below:

Abstract, line 4, "a" should be --an--.

Abstract, line 4, "triangularly" should be --triangular--.

Column 2, line 38, "an" should be --a--.

Column 3, line 55, "slide" should be --slid--.

Column 4, line 52, "constituents-- should be --constitutes--.

Column 5, line 31, Claim 5, "vertically" should be --vertical--.

Column 5, line 34, Claim 6, "on" should be --one--.

Signed and Sealed this

Twelfth Day of April, 1994

Attest:

BRUCE LEHMAN

Attesting Officer    Commissioner of Patents and Trademarks